(12) United States Patent
Bowman et al.

(10) Patent No.: US 9,044,902 B2
(45) Date of Patent: Jun. 2, 2015

(54) RADIO FREQUENCY MAGNETIC FIELD RESPONSIVE POLYMER COMPOSITES

(75) Inventors: Christopher Bowman, Boulder, CO (US); Brian Adzima, Boulder, CO (US); Christopher Kloxin, Boulder, CO (US)

(73) Assignee: The Regents of the University of Colorado, a Body Corporate, Denver, CO (US)

( * ) Notice: Subject to any disclaimer, the term of this patent is extended or adjusted under 35 U.S.C. 154(b) by 310 days.

(21) Appl. No.: 13/303,782

(22) Filed: Nov. 23, 2011

(65) Prior Publication Data

US 2012/0160828 A1 Jun. 28, 2012

Related U.S. Application Data

(60) Provisional application No. 61/417,795, filed on Nov. 29, 2010.

(51) Int. Cl.
| | |
|---|---|
| *C08K 3/22* | (2006.01) |
| *B29C 73/16* | (2006.01) |
| *B29C 73/18* | (2006.01) |
| *B29C 35/02* | (2006.01) |
| *C09J 5/06* | (2006.01) |
| *B29C 65/36* | (2006.01) |
| *B29C 65/76* | (2006.01) |
| *B29C 65/00* | (2006.01) |
| *B29K 105/20* | (2006.01) |
| *B29C 35/08* | (2006.01) |

(52) U.S. Cl.
CPC ......... *B29C 73/16* (2013.01); *C08K 2003/2251* (2013.01); *B29C 65/3612* (2013.01); *B29C 65/76* (2013.01); *B29C 66/0242* (2013.01); *B29C 66/721* (2013.01); *B29C 66/73756* (2013.01); *B29C 66/91921* (2013.01); *B29K 2105/203* (2013.01); *B29C 73/18* (2013.01); *B29C 35/0272* (2013.01); *C09J 5/06* (2013.01); *B29C 2035/0861* (2013.01); *C09J 2205/31* (2013.01); *C09J 2400/226* (2013.01); *C08K 3/22* (2013.01); *C08K 2201/01* (2013.01); *B29C 65/368* (2013.01); *B29C 66/91651* (2013.01); *B29C 66/91216* (2013.01); *B29C 66/91315* (2013.01); *B29C 66/91411* (2013.01); *B29C 66/91445* (2013.01); *B29C 66/919* (2013.01); *B29C 66/9192* (2013.01)

(58) Field of Classification Search
CPC ............. C08K 3/22; C08K 2003/2251; C08K 2003/2272; C08K 2201/01; B29C 73/16; B29C 73/18; C09J 5/06
USPC .................................................. 524/406, 431
See application file for complete search history.

(56) References Cited

U.S. PATENT DOCUMENTS

| | | | |
|---|---|---|---|
| 3,826,760 A | 7/1974 | Takeshita et al. | |
| 5,378,879 A | 1/1995 | Monovoukas | |
| 5,856,395 A * | 1/1999 | Tanisho et al. | 524/413 |
| 6,534,611 B1 * | 3/2003 | Darling et al. | 526/338 |
| 6,615,892 B2 * | 9/2003 | Hubbard et al. | 156/428 |
| 6,933,361 B2 | 8/2005 | Wudl et al. | |
| 2007/0142494 A1 * | 6/2007 | Kalgutkar et al. | 523/115 |

FOREIGN PATENT DOCUMENTS

WO 91/11082 7/1991

OTHER PUBLICATIONS

Adzima et al., "Externally Triggered Healing of a Theremoreversible Covalent Network via Self-Limited Hysteresis Heating," *Adv. Mater.*, 2010, 22:2784-2787.
Chen et al., "A Thermally Re-mendable Cross-Linked Polymeric Material," *Science*, Mar. 2002, 295:1698-1702.
Chen et al., "New Thermally Remendable Highly Cross-Linked Polymeric Materials," *Macromolecules*, 2003, 36:1802-1807.
Adzima et al., "Rheological and Chemical Analysis of Reverse Gelation in a Covalently Cross-Linked Diels—Alder Polymer Network," *Macromolecules*, 2008, 41:9112-9117.
Boul et al., "Reversible Diels-Alder Reactions for the Generation of Dynamic Combinatorial Libraries," *Organic Letters*, 2005, 7(1):15-18.
Kloxin et al., "Covalent Adaptable Networks (CANs): A Unique Paradigm in Cross-Linked Polymers," *Macromolecules*, 2010, 43:2643-2653.
Deng et al., "Covalent Cross-Linked Polymer Gels with Reversible Sol-Gel Transition and Self-Healing Properties," *Macromolecules*, 2010, 43:1191-1194.

* cited by examiner

*Primary Examiner* — Vickey Nerangis
(74) *Attorney, Agent, or Firm* — Saul Ewing LLP; Kathryn Doyle; Domingos J. Silva

(57) ABSTRACT

The invention includes a composite material comprising magnetic field responsive particles distributed in a reversibly crosslinked polymer, wherein the reversibly crosslinked polymer includes thermally reversible bonds. In one embodiment, exposing the composite material to an electromagnetic field allows for crack-healing, remolding and/or bonding of the material.

17 Claims, 4 Drawing Sheets

(a)

(b)

RADIO FREQUENCY MAGNETIC FIELD RESPONSIVE POLYMER COMPOSITES

CROSS-REFERENCE TO RELATED APPLICATION

The present application is entitled to priority under 35 U.S.C. §119(e) to U.S. Provisional Application No. 61/417,795, filed Nov. 29, 2010, which application is incorporated by reference herein in its entirety.

STATEMENT REGARDING FEDERALLY SPONSORED RESEARCH OR DEVELOPMENT

This invention was made with government support under grant number DE010959 awarded by the National Institutes of Health. The government has certain rights in the invention.

BACKGROUND OF THE INVENTION

Polymeric materials are often differentiated into classes by their behavior upon heating: thermoplastics deform and flow at temperatures greater than their melting point, while thermosets remain intractable until the temperature is reached where destructive decomposition occurs. Such a classification scheme works well for polymers formed from highly exergonic reactions that are essentially irreversible; however, polymers that contain readily reversible covalent bonds capable of undergoing rearrangement can be used to create materials that fit neatly into neither category and have beneficial attributes of both. Furthermore, the living nature of such polymerizations causes unique post-polymerization behavior.

Thermoreversible adaptable polymers are materials capable of undergoing a reversible gel-to-sol transition because they incorporate thermoreversible bonds. These thermoreversible covalent bonds are an order of magnitude stronger than hydrogen bonds (Israelachvili, 2002), yet they permit the material to be thermoreversibly transitioned from a crosslinked solid to a non-gelled oligomeric state. As a result, the material is both mechanically strong and readily able to heal fractures and other defects (Chen et al., 2002; Chen et al., 2003). Unfortunately, thermoreversible healing mechanisms are often limited by irreversible side reactions that occur at elevated temperatures (well beyond the sol-to-gel transition temperature). Additionally, strategies for selectively heating a material that is either spatially confined or surrounded by other thermally sensitive materials possess its own set of challenges.

In principle, most polymerizations are reversible. However, realizing depolymerization often leads to complete and irreversible degradation of the polymer. Certain polymers, including those created by radical and ionic polymerization, often depolymerize when heated above a ceiling temperature, which is typically quite high. At such temperatures, irreversible degradation of other molecular structures generally occurs. A few polymers, including poly-(R-methyl styrene) and poly(isobutene), display more moderate ceiling temperatures (61 and 50° C., respectively) (Odian, 1991). In condensation polymerizations, condensate removal favors the forward reaction, thus the retro-reaction is only achieved when the condensate is present in significant quantities.

U.S. Pat. No. 6,933,361, hereby incorporated by reference, describes thermally re-mendable polymeric materials that are made from multivalent furan monomers and multivalent maleimide monomers via the Diels-Alder (DA) reaction. The furan monomers are described as requiring at least three furan moieties and the maleimide monomers are described as requiring at least three maleimide monomers.

A variety of in situ temperature control methods are possible for composite materials, including resistance heating (Park et al., 2008), photothermal particle heating (Sershen et al., 2005), and hysteresis heating. (Ahmed et al., 2006; Suwanwatana et al., 2006). In situ resistance heating employs a resistance element incorporated in the polymer-containing material and linked to an external power supply. Photothermal particles convert visible to near-infrared electromagnetic radiation into heat, and thus the heating is controlled by the combination of light intensity, absorption and wavelength. Although this method is externally triggered, it suffers from the attenuation of light into the material. Hysteresis heating is one of several heating mechanisms that occur when a magnetic material is placed within a magnetic field alternating at radio frequencies (Bozorth, 1978). By selecting appropriate frequencies and particles sizes, these mechanisms may be limited to Neel relaxation. In this process, the magnetic domains attempt to align with the external field while also interacting with neighboring magnetic domains. The interaction between magnetic domains is accompanied by lattice distortion, which has a storage and loss response, the latter producing heat. At temperatures above the Curie temperature, the magnetic domains within a ferrimagnetic or ferromagnetic material randomize, causing the material to undergo a second order phase change to a paramagnetic material. As a result the magnetic susceptibility vanishes and hysteresis heating becomes negligible.

U.S. Pat. No. 5,378,879, hereby incorporated by reference, describes induction heating of a non-magnetic, electrically non-conducting host material through distribution of ferromagnetic or ferromagnetic particles (including iron, nickel and cobalt) within the material and exposure of the host material to an alternating high frequency electromagnetic field. PCT Application No. WO/1991011082, hereby incorporated by reference, also describes methods for providing heat to selected materials by subjecting the combination of the materials and magnetic particles to an alternating magnetic field. Many common ferromagnetic materials, such as Ni, Fe, and Co, have a Curie temperature well above the temperature where irreversible polymer decomposition occurs (i.e., 358, 770, and 1,130° C., respectively) (Bozorth, 1978). While such materials' particles have been successfully used in low concentrations to limit the temperature reached by the bulk polymer, the temperature limitation here is associated with heat transfer rates and becomes a strong function of the sample geometry and shape. Further, regions adjacent to the polymer are likely to reach very high temperatures.

There is a need in the art for novel polymeric materials that may undergo crack-healing or remolding under mild conditions. Such materials would be useful in applications where self-healing of a polymer is needed. The present invention meets this need.

BRIEF SUMMARY OF THE INVENTION

The invention includes a composite comprising a reversibly crosslinked polymer, wherein at least one magnetic field responsive particle is dispersed within the composite, wherein the reversibly crosslinked polymer comprises at least one thermally reversible bond, wherein applying an electromagnetic field of given strength alternating at a first frequency to the composite heats the composite to a first temperature at which the at least one thermally reversible bond is broken.

In one embodiment, the at least one magnetic field responsive particle comprises a particle selected from the group consisting of a ferrimagnetic particle, ferromagnetic particle, antiferromagnetic particle, and a combination thereof. In another embodiment, the at least one magnetic field responsive particle comprises a particle selected from the group consisting of chromium (IV) oxide, ferrite, cobalt, nickel, and a combination thereof, wherein the ferrite is optionally compounded with at least one element selected from the group consisting of zinc, manganese, cobalt, nickel, lithium, iron, copper, and a combination thereof. In yet another embodiment, the at least one thermally reversible bond is a thermoreversible covalent or physical bond. In yet another embodiment, the thermoreversible covalent bond is formed via a reaction selected from the group consisting of Diels-Alder reaction, nitroso dimerization, azlactone-phenol adduct formation, alkoxyamine formation, cyclic carbonate formation, polyalkylhydrazone formation, [2+2] cycloaddition, and a combination thereof. In yet another embodiment, the average size of the at least one magnetic field responsive particle is less than or equal to about 100 microns. In yet another embodiment, the first temperature is lower than the temperature at which the polymer undergoes irreversible decomposition.

The invention also includes a method of repairing at least one crack or fracture in a polymer-containing composite. The method includes the step of providing a polymer-containing composite comprising at least one crack or fracture, wherein the inner surfaces of the at least one crack or fracture comprise a reversibly crosslinked polymer, wherein the reversibly crosslinked polymer comprises at least one thermally reversible bond, and wherein at least one magnetic field responsive particle is dispersed within the crosslinked polymer. The method further includes the step of applying an electromagnetic field of given strength alternating at a given frequency to the polymer-containing composite, wherein the applying heats the polymer-containing composite to a first temperature at which the at least one thermally reversible bond is broken. The method further includes the step of providing contact among the inner surfaces of the at least one crack or fracture. The method further includes the step of cooling the polymer-containing composite to a second temperature lower than the first temperature; thereby repairing the at least one crack or fracture in the polymer-containing composite.

In one embodiment, the second temperature is equal to or lower than the gel-point temperature of the polymer-containing composite. In another embodiment, the first temperature is equal to or higher than the gel-point temperature of the polymer-containing composite. In yet another embodiment, the at least one magnetic field responsive particle comprises a particle selected from the group consisting of a ferrimagnetic particle, ferromagnetic particle, antiferromagnetic particle, and a combination thereof. In yet another embodiment, the at least one magnetic field responsive particle comprises a particle selected from the group consisting of chromium (IV) oxide, ferrite, and a combination thereof, wherein the ferrite is optionally compounded with at least one element selected from the group consisting of zinc, manganese, cobalt, nickel, lithium, iron, copper, and a combination thereof. In yet another embodiment, the at least one thermally reversible bond is a thermoreversible covalent or physical bond. In yet another embodiment, the thermoreversible covalent bond is formed via a reaction selected from the group consisting of Diels-Alder reaction, nitroso dimerization, azlactone-phenol adduct formation, alkoxyamine formation, cyclic carbonate formation, polyalkylhydrazone formation, [2+2] cycloaddition, and a combination thereof.

The invention also includes a method of bonding at least two polymer-containing composites. The method comprises the step of providing at least two polymer-containing composites, wherein the surfaces to be joined of the at least two polymer-containing composites comprise a crosslinked polymer, wherein the crosslinked polymer comprises at least one thermally reversible bond, and wherein at least one magnetic field responsive particle is dispersed within the crosslinked polymer. The method further comprises the step of applying an electromagnetic field of given strength alternating at a given frequency to the at least two polymer-containing composites, wherein the applying heats the at least two polymer-containing composites to a first temperature at which the at least one thermally reversible bond is broken. The method further comprises the step of contacting the surfaces to be joined of the at least two polymer-containing composites. The method further comprises the step of cooling the surfaces to be joined of the at least two polymer-containing composites to a second temperature lower than the first temperature; thereby joining the at least two polymer-containing composites.

In one embodiment, the second temperature is lower than the gel-point temperature of the polymer-containing composite. In another embodiment, the first temperature is equal to or higher than the gel-point temperature of the polymer-containing composite. In yet another embodiment, the at least one magnetic field responsive particle comprises a particle selected from the group consisting of a ferromagnetic particle, ferromagnetic particle, antiferromagnetic particle, and a combination thereof. In yet another embodiment, the at least one magnetic field responsive particle comprises a particle selected from the group consisting of chromium (IV) oxide, ferrite, and a combination thereof, wherein the ferrites is optionally compounded with a metal selected from the group consisting of zinc, manganese, cobalt, nickel, lithium, iron, copper, and a combination thereof. In yet another embodiment, the at least one thermally reversible bond is a thermoreversible covalent or physical bond, and wherein the thermoreversible covalent bond is formed via a reaction selected from the group consisting of Dick-Alder reaction, nitroso dimerization, azlactone-phenol adduct formation, alkoxyamine formation, cyclic carbonate formation, polyalkylhydrazone formation, [2+2] cycloaddition, and a combination thereof.

BRIEF DESCRIPTION OF THE FIGURES

For the purpose of illustrating the invention, there are depicted in the drawings certain embodiments of the invention. However, the invention is not limited to the precise arrangements and instrumentalities of the embodiments depicted in the drawings.

FIG. 1B:

FIGS. 4A-4B, is a series of graphs illustrating the flexural modulus (FIG. 4A) and ultimate strength (FIG. 4B) of a PPTF/DPBM sample with 1.0% wt $CrO_2$ after ten cycles of being fractured and repaired. No significant change was observed in either material property, demonstrating the ability of this material to repeatedly heal damage.

DETAILED DESCRIPTION OF THE INVENTION

Figure 1:
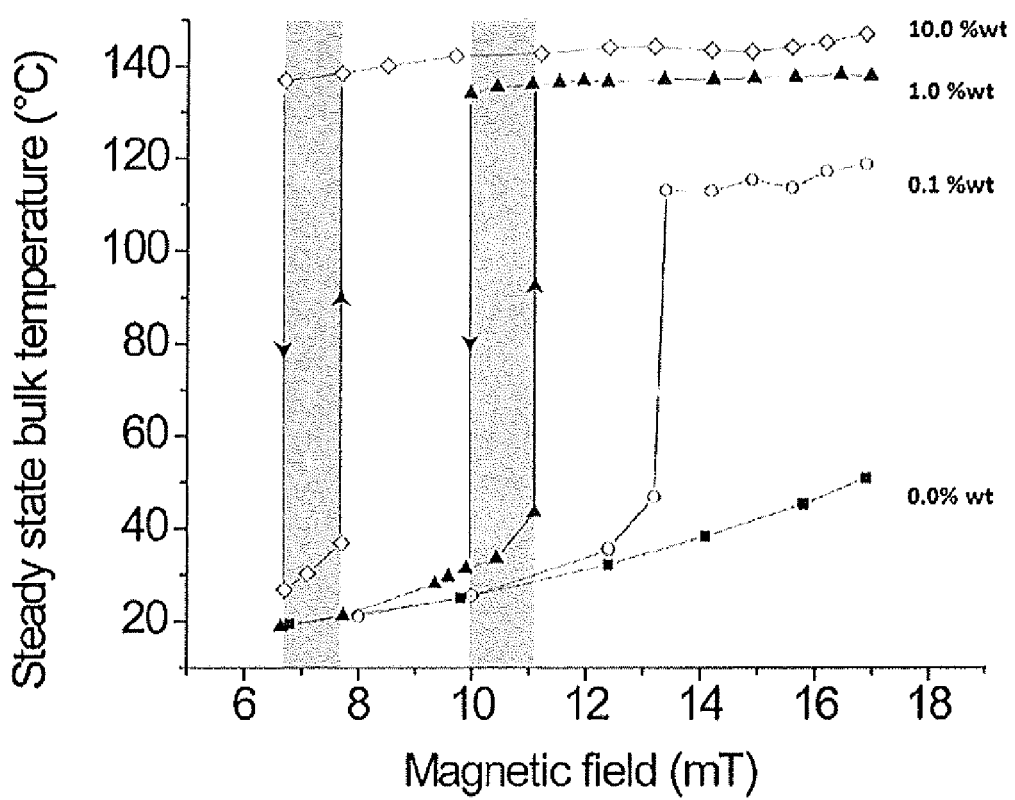
FIG. 1 is a graph illustrating material temperature as a function of magnetic field. The steady state temperature of three different compositions of $CrO_2$ particles in a thermoreversible polymer composition is illustrated as a function of the applied magnetic field strength: 0.0% wt. (■), 0.1% wt. (○), 1.0% wt. (▲), and 10.0% wt. (◇). The grey boxes denote regions where the system shows path dependence. Samples initially at an elevated temperature did not cool to the lower temperatures, unless brought to field strengths lower than the left side of the box. Samples at lower temperatures did not reach elevated temperatures, unless brought to field strengths greater than the right side of the box.

The invention relates to novel thermoreversible polymer materials that may be heated in situ via self-limiting heating technique, which minimizes irreversible reactions. As a consequence, the properties of the materials may be unchanged even after multiple cycles of fracture and repair, achieving its native properties after each and every fracture and repair cycle. In one aspect, the healing mechanisms of the invention are faster than those obtained for thermoplastic materials, since the oligomeric liquids resulting from depolymerization allow for significantly enhanced diffusion.

In one aspect, the invention includes composite materials comprising magnetic field responsive particles distributed in a crosslinked polymer matrix, wherein the crosslinked polymer includes thermally reversible bonds. When the magnetic field responsive particles are exposed to an electromagnetic field of appropriate strength alternating at appropriate radio frequencies, the particles generate heat sufficient to break thermally reversible bonds within the crosslinked polymer. The extent of bond breakage may vary. In an embodiment, the bond breakage is extensive enough to cause partial or nearly complete depolymerization to oligomeric species, thereby allowing flow of the material. The change in polymer physical state upon exposure to the electromagnetic field can allow crack-healing or remolding of the material.

The materials of the invention may be used in a variety of applications. In one embodiment, they may be used to form polymer-based articles. In another embodiment, the materials of the invention may also be used as coatings or adhesives. Their activation with radiofrequency electromagnetic fields, rather than by light, also allows their use in combination with optically thick materials. In yet another embodiment, they may be used to join optically thick materials such as thermoplastic composites. In yet another embodiment, the materials of the invention may be used as a matrix in a composite material also including a reinforcement material such as particles or continuous or chopped fibers. Composites of thermoset polymers and glass and/or carbon fibers may be used for wind turbine blades and helicopter rotors. Such large polymer composites are subjected to repeated stresses, which can lead to fatigue induced cracking. Healing of such fatigue induced cracks can prevent catastrophic failure.

Definitions

As used herein, each of the following terms has the meaning associated with it in this section.

As used herein, unless defined otherwise, all technical and scientific terms generally have the same meaning as commonly understood by one of ordinary skill in the art to which this invention belongs. Generally, the nomenclature used herein and the laboratory procedures in cell culture, molecular genetics, organic chemistry, and peptide chemistry are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" is understood by persons of ordinary skill in the art and varies to some extent on the context in which it is used. As used herein, "about" when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

As used herein, the term "comprising" includes "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

As used herein, the term "polymer" refers to a molecule composed of repeating structural units typically connected by covalent chemical bonds. The term "polymer" is also meant to include the terms copolymer and oligomers.

As used herein, the term "polymerization" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combination thereof. A polymerization reaction may consume between about 0% and about 100% of the at least one functional group available in the system. In one embodiment, polymerization of at least one functional group results in about 100% consumption of the at least one functional group. In another embodiment, polymerization of at least one functional group results in less than about 100% consumption of the at least one functional group.

As used herein, the term "reversibly crosslinked" as applied to a polymer refers to a polymer that is crosslinked intermolecularly or intramolecularly through a reversible reaction, which in one embodiment may be covalent (e.g., formation of a covalent bond) or physical (e.g., formation of a hydrogen bond or salt bridge).

As used herein, the term "crosslinking reaction" as applied to a reversible crosslinking reaction refers to the reaction direction in which the crosslinks are formed. In the case of a Diels-Alder reaction, the crosslinking reaction is the reaction of the diene and dienophile to form the corresponding Diels-Alder adduct.

As used herein, the term "reverse crosslinking reaction" as applied to a reversible crosslinking reaction refers to the reaction direction in which the crosslinks are broken. In the case of a Diels-Alder reaction, the reverse crosslinking reaction is the dissociation of the Diels-Alder adduct into the corresponding diene and dienophile.

As used herein, the term "magnetic field responsive particle" refers to a particle that is capable of generating sufficient heat for purposes of this invention when subjected to an alternating magnetic field having a specified frequency. Magnetic field responsive particles useful in this invention include ferrimagnetic particles, ferromagnetic particles and antiferromagnetic particles, such as but not limited to iron, cobalt, nickel, iron (III) oxide, and chromium (IV) oxide.

As used herein, a "diene" group is a conjugated π system with 4 π electrons.

As used herein, the term "diene-containing reactant" refers to a molecule comprising a diene group (such as a furan or furan derivative group) in its structure.

As used herein, a "dienophile" group is a conjugated it system with 2 π electrons.

As used herein, the term "dienophile-containing reactant" refers to a molecule comprising a dienophile group (such as a maleimide or a maleimide derivative group) in its structure.

As used herein, the term "instructional material" includes a publication, a recording, a diagram, or any other medium of expression that may be used to communicate the usefulness of the compositions of the invention. In one embodiment, the instructional material may be part of a kit useful for generating a system of the invention. The instructional material of the kit may, for example, be affixed to a container that contains the compositions of the invention or be shipped together with a container that contains the compositions. Alternatively, the instructional material may be shipped separately from the container with the intention that the recipient uses the instructional material and the compositions cooperatively. For example, the instructional material is for use of a kit; instructions for use of the compositions; or instructions for use of a formulation of the compositions.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Disclosure

In comparison with linear polymer systems, whose physical state above the glass transition is dictated by chain mobility, the physical state of a thermally reversible chemical gel is controlled by the network connectivity, and therefore the extent of reaction (Adzima et al., 2008). The Diels-Alder (DA) reaction is well suited to control the extent of reaction.

As is known in the art, thermoreversible covalent bonds may be formed through Diels-Alder reactions. While there are many reversible covalent chemical reactions (Engle & Wagener, 1993; Kloxin et al., 2010), few are as robust or possess the unique behavior of the Diels-Alder reaction, such as the reaction between between furan (1) and maleimide (2) (Scheme 1, wherein $R_1$ and $R_2$ are substituents). Upon heating, the Diels-Alder adduct (3) readily undergoes a retro-Diels-Alder reaction to recover (1) and (2). Polymers formed by the Diels-Alder reaction are reversibly depolymerized by increasing the temperature.

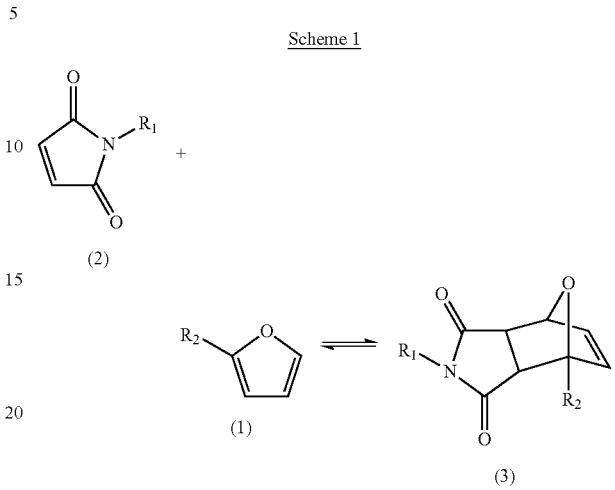

Scheme 1

At lower temperatures equilibrium favors the forward reaction, resulting in bond formation and gelation. At elevated temperatures the retro-Diels-Alder reaction is favored, and the bond is reversibly broken. The chemical equilibrium between the forward and reverse reactions displays significant temperature dependence over a range considerably lower than the associated competing irreversible reactions. Conventional polymer melts relax via curvilinear diffusion (i.e., reptation) owing to the presence of entanglements, whereas Diels-Alder networks are capable of becoming an oligomeric liquid with significantly enhanced diffusion and the possibility for macroscale flow.

In one embodiment, the thermoreversible covalent bond is formed through a Diels-Alder reaction between a diene and a dienophile, resulting in the presence of Diels-Alder (DA) adducts in the polymer. In another embodiment, the diene is a furan and the dienophile is a maleimide and the thermally reversible covalent bonds are formed between the furan moieties and the maleimide moieties. In yet another embodiment, the diene-containing reactant comprises a furan group, the dienophile-containing reactant comprises a maleimide group, and the reversible covalent bonds are formed between the furan moieties and the maleimide moieties. In yet another embodiment, the diene-containing reactant comprises from about 3 to about 6 furan groups. The furan groups preferably do not include any substitution groups that might interfere with the Diels-Alder reaction. The furan molecule may have a molecular weight from 134 amu to 1,000 amu, from 134 amu to 10,000 amu; or greater than 10,000 amu. In another embodiment, the dienophile-containing reactant comprises from about 2 to about 6 maleimide groups. The maleimide molecule may have a molecular weight from 134 amu to 500 amu, from 134 amu to 1,000 amu, from 134 amu to 10,000 amu; or greater than 10,000 amu. The maleimide groups preferably do not include any substitution groups that might interfere with the Diels-Alder reaction.

In one embodiment, the diene-containing reactant comprises a cyclic diene. In another embodiment, the diene-containing reactant comprises a five-membered ring cyclic diene. Five-membered cyclic dienes include, but are not limited to, furan, cyclopentadiene, fulvene and derivatives thereof. In another embodiment, the diene-containing reactant comprises an open chain diene, such as a cis-1,3-butadiene-type monomer. In yet another embodiment, the diene is aromatic. In yet another embodiment, the furan monomer has from 3 to 6 furan moieties. The furan moieties preferably do not include any substitution groups that might interfere with the Diels-Alder reaction.

In an embodiment, the dienophile-containing reactant comprises a substituted or non-substituted cyclic alkene. The dienophile-containing reactant may include a five membered ring cyclic dienophile. Suitable cyclic dienophiles include, but are not limited to, maleimide and derivatives thereof. A non-limiting illustrative example of a non-cyclic dienophile is cyanoolefins (Boul et al., 2005). In another embodiment, the maleimide monomer has from 2 to 6 maleimide moieties. The maleimide moieties preferably do not include any substitution groups that might interfere with the Diels-Alder reaction.

In one embodiment, the diene/dienophile-containing reactant pair is furan/maleimide. Other exemplary diene/dienophile-containing reactant pairs include, but are not limited to: cyclopentadiene (which may react as diene and/or dienophile) (U.S. Pat. No. 3,826,760; Kennedy & Castner, 1979; Stevens & Jenkins, 1979; Salamone et al., 1988; Chen & Ruckenstein, 1999; Grigoras et al., 2008); maleimide and anthracene (Jones et al., 1999; Grigoras et al., 2008); cyanoethylenes and anthracene (Reutenauer et al., 2009); and cyanoethylenes and fulvenes (Bout et al., 2005). The reactivity of the particular diene and dienophile pairs influences the equilibrium monomer conversion at a given temperature.

In one embodiment, at least some of the monomers in the mixture contain at least one functional group selected from the group consisting of a diene or a dienophile. In another embodiment, some monomers include one or more diene functional groups, but no dienophile groups, while other monomers include one or more dienophile functional groups, but no diene groups. In yet another embodiment, a polymer-containing composition is formed through polymerization of two types of monomers, a first type which contains diene functional groups and a second group which contains dienophile functional groups.

In one embodiment, a monomer in the mixture may contain polymerizable groups other than a diene or dienophile. An example of such a monomer is a furan and maleimide adduct that has two methacrylate groups attached (Heath et al., 2008). In one embodiment, the number of polymerizable groups other than a diene or dienophile is less than that which would be required to form a gel.

In one embodiment, the diene and dienophile groups are selected together to allow the forward and retro Diels Alder reactions to occur at a suitable reaction temperatures. In an embodiment, the temperature of the forward reaction upper limit is lower than the reverse reaction lower limit, with the reverse reaction lower limit being sufficiently low to limit competing irreversible reactions.

In one embodiment, at least one of the monomers contains a functionality that helps kinetically limit breakage of network bonds at temperatures below the gel point temperature. In another embodiment, at least one of the monomers contains a rigid aromatic group such as a diphenyl or bisphenol core.

In one aspect, the thermally reversible bonds in the polymer are thermoreversible covalent bonds. Other ways of forming reversible covalent bonds include, but are not limited to: nitroso dimerization (Engle & Wagener, 1993), azlactone-phenol adduct formation (Engle & Wagener, 1993), alkoxyamines (Higaki et al., 2006), cyclic carbonates (Miyagawa et al., 2005), cyclic orthoesters (Endo et al., 1996a,b), polyalkylhydrazones (Ono et al., 2007; Deng et al., 2010), and cycloadducts of [2+2] cycloadditions (Chung et al., 2004).

In one embodiment, the thermally reversible bonds may be thermoreversible physical bonds. Thermoreversible physical bonds include, but are not limited to hydrogen bonds, helix formation and combinations thereof.

The composite material may be formed by polymerization of a monomer mixture comprising a plurality of monomers and magnetic field responsive particles. In one embodiment, the monomer mixture need not contain a solvent. In another embodiment, the monomer mixture contains a solvent, which may lower the gel point temperature for a given extent of conversion. Other components that may be present in the mixture include, but are not limited to: fillers, dyes, plasticizers, surfactants, and flame retarders. After the monomer mixture is formed, it is held at a temperature suitable for formation of thermally reversible bonds between at least some of the monomers in the mixture. The thermally reversible bonds may be formed in the main chains or in crosslinks.

The magnetic field responsive particles may be mixed with the monomers by any means known to the art. In one embodiment, the particles may be dispersed in a liquid carrier, which is then mixed with monomer. The liquid may be removed after mixing with the monomer. In another embodiment, the particles may be coated or surface-functionalized in order to improve their dispersion in the monomer mixture and/or the polymer network.

In one embodiment, the magnetic field responsive particles are ferromagnetic particles of chromium (IV) oxide ($CrO_2$), which possesses a Curie temperature of 113° C. (Kittel, 1996).

In one embodiment, the particles are ferrimagnetic particles such as ferrites. The Curie temperatures of ferrites may be adjusted by compounding them with zinc, manganese, cobalt, nickel, lithium, iron, or copper (Murkami, 1965; Smit & Wijn, 1959). Nickel zinc ferrites ($Ni_{1-x}Zn_xFe_2O_4$) have been reported to have Curie temperatures between about 350° C. and 100° C. in the range x=0.4 to 0.8 (Zhang et al., 2003).

In one embodiment, the size of the magnetic field responsive particles is selected so that the particles generate heat at least in part through a hysteresis heating mechanism. For multidomain heating processes to operate, the critical single domain size should be exceeded (so that the particles are multidomain particles). The critical single domain diameter can depend both on the particle composition and shape. For $CrO_2$, the critical single domain diameter can be estimated as 180 nm for spherical particles and 60 nm for a prolate ellipsoid (Kronmuller & Fahnle, 2003). In different embodiments, the average particle size is less than or equal to about 100 microns, about 50 microns, about 25 microns, about 10 microns, about 5 microns, or about 1 micron.

The particle concentration may be selected to obtain the desired amount of heating for the selected magnetic field strength and frequency. In one embodiment, the particle concentration is from 0.05 to 30 wt %, from 0.1% to 20 wt %, from 0.1% to 10 wt %, or from 0.5 to 5 wt %.

The magnetic field strength is selected to provide the desired amount of heating. In one embodiment, the magnetic field strength is selected to be in or above a range where the sample temperature increases significantly with increasing field strength (for fixed particle composition, concentration and field frequency). This field strength range may be composition dependent. In an embodiment, the magnetic field strength is from 1 mT to 25 mT. In one embodiment, the frequency of the alternating electromagnetic field is from 100 kHz to 1 MHz, 100 kHz to 50 MHz, or 1 to 10 MHz.

In one embodiment, the network architecture of the polymer-containing composition is designed so that the composition is capable of undergoing a gel-to-sol transition. In one embodiment, the gel represents the infinite macromolecular network, and the sol represents the portion of the material that is not attached to the macromolecular network. In another embodiment, the gel-point conversion is a critical transition point where there is a single sample spanning macromolecule, and it is defined mathematically as the conversion where the weight average molecular weight diverges. In reversible covalently bound gels, the gel-point conversion depends on the functionality of monomers, and unlike conventional step-growth thermosets, the temperature dependence of the bond. Accordingly, a temperature (the gel-point temperature) exists below which the material is in a solid gel state, and above which it is in a liquid-like or sol state. Below this temperature, network bonds may still break and reform, although the rate of bond breakage is expected to be lower with temperatures farther below this temperature. In an embodiment, the gel-point temperature is from 30° C. to 140° C., from 30° C. to 120° C., from 30° C. to 115° C., from 50° C. to 140° C., from 50° C. to 120° C., from 50° C. to 115° C., from 70° C. to 140° C., from 70° C. to 120° C., or from 70° C. to 115° C.

Designing a polymer-containing composition where this transition is realized involves consideration of both the functional group reactivity, which dictates the equilibrium conversion at a given temperature, and monomer functionality, which controls the conversion required for gel formation. In the case of a pair of Diels-Alder reactants, such as furan and maleimide, monomer functionality may be selected to be minimal so that a high equilibrium conversion is required for gelation to occur. If the monomer functionality is quite high, it can be difficult to drive the Diels-Alder reaction sufficiently towards the reactants (and associated reversible bond cleavage) without the use of an open, non-equilibrium experiment, or high temperatures that lead to irreversible reactions. In an embodiment, the average functionality the monomers used to form the network is greater than 2. In different embodiments, the number of functional groups per monomer is from 2 to 4, from 2 to 6, from 2 to 10, or from 2 to 16. In an embodiment, one of the monomers has an average functionality of 2.

The molecular weight of the monomers can also be selected to tune the network properties. Increasing the molecular weight results in a decrease in functional group concentration, which in turn favors the retro-Diels-Alder reaction and depolymerization. As a consequence the gel point temperature is shifted to lower temperatures.

Appropriate magnetic field frequencies and particle sizes are selected to obtain the desired heating mechanism. The extent of heating can also be influenced by the concentration of ferromagnetic particles in the composite and the strength of the magnetic field.

In an embodiment, the magnetic field responsive particles generate heat at least in part through a hysteresis heating mechanism. For ferrimagnetic and ferromagnetic materials, the hysteresis heating approach provides a self-limiting mechanism that is precisely controlled by the Curie temperature of the material, and is not present in materials that heat in an alternating magnetic field via other mechanisms such as the Brownian relaxation of super-paramagnetic particles or induced currents in conductive materials. For antiferromagnetic materials, the Neel temperature is the corresponding parameter. In one embodiment, the Curie or Neel temperature of the particles is selected to be below the temperature where irreversible decomposition of the polymer occurs. In another embodiment, the Curie or Neel temperature is below 150° C., 140° C. or 120° C. In yet another embodiment, the Curie or Neel temperature of the particles is selected to be at or above the gel-point temperature of the polymer network.

Methods of the Invention

The invention includes methods of using the materials of the invention. In one aspect, the invention includes a method of heat-treating a material of the invention, the method including the step of heating the material by exposing it to an electromagnetic field of sufficient strength and frequency to cause breakage of thermoreversible bonds within the crosslinked polymeric network. In this method, the material may be heated to a temperature greater than or equal to the gel-point temperature of the crosslinked polymer. In another embodiment, the material may be heated to a temperature below the gel-point temperature of the crosslinked polymer. Typically, the heating step is followed by a cooling step in which the polymer is cooled to a temperature lower than that used in the heating step. Generally, the material is cooled to a temperature below the gel-point temperature of the polymer-containing composition.

In another aspect, the invention includes a method of healing a crack or fracture in the material of the invention, each crack or fracture site being defined by surfaces located on either side of the fracture site. The method includes the steps of heating the fracture site by exposing it to an electromagnetic field of sufficient strength and frequency to cause breakage of thermoreversible bonds located at or near the fracture surfaces, providing contact of the fracture surfaces, and cooling the material to allow formation of thermoreversible bonds, thereby allowing healing of the crack or fracture. No additional ingredients, such as catalysts, are required. Further, no additional monomers or special surface treatment is required in order to repair fractures.

In yet another aspect, the invention includes a method for joining at least two articles. The method comprises providing the material of the invention between the two articles, heating the material to a temperature greater than or equal to the gel-point temperature of the crosslinked polymer, and then cooling the polymer to a temperature below the gel-point temperature. Such a method may be useful for joining at least two optically thick composite parts. The methods of the invention may also be used to join at least two articles formed from the material of the invention, so long as thermoreversible bonds can be formed between a first surface of the first article and a first surface of the second article.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. Although the description herein contains many embodiments, these should not be construed as limiting the scope of the invention but as merely providing illustrations of some of the presently preferred embodiments of the invention.

All references throughout this application (for example, patent documents including issued or granted patents or equivalents; patent application publications; and non-patent literature documents or other source material) are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application. In general the terms and phrases used herein have their art-recognized meaning, which can be found by reference to standard texts, journal references and contexts known to those skilled in the art. Any preceding definitions are provided to clarify their specific use in the context of the invention.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Experimental

Polymer Synthesis

Pentaerythritol propoxylate tris(3-(furfuryl-thiol)propionate) (PPTF) was synthesized via the Michael-addition of furfuryl mercaptan and pentaerythritol propoxylate triacrylate (Adzima et al., 2008).

Deionized water and denatured ethanol were added to chromium (IV) oxide ($CrO_2$) particles (Magtrieve®) in the ratio of 200 g D1 $H_2O$: 200 g alcohol: 1 g chromium oxide powder and the mixture was sonicated using a SharperTek Ultrasound Cell Crusher for 10 minutes at 20 Watts power. PPTF was then added to the mixture and the alcohol and water were removed in vacuo. The mixture was then added to a stoichiometric equivalent of 1,1'-(methylenedi-4,1-phenylene) bismaleimide (DPBM, Sigma Aldrich, no further purification) and heated to 150° C. for 30 minutes (above the melt temperature of DPBM). Upon cooling a glossy black solid was formed. Magtrieve® particles have been reported to be needle-like in shape with dimensions of approximately 550 nm by 45 nm (Sivakumar et al., 2008).

Temperature Measurements:

All experiments were carried out in a Taylor-Winfield 7.5 kW Ther-Monic generator, using a 3-turn solenoid coil (113 turns per meter). One gram samples of polymer were formed in a glass scintillation vial, which was revolved in the coil at ~8 rpm to insure uniform radial exposure to the RF field. An Omega Engineering OS552-V1-6 pyrometer was used to measure the sample temperature. Field strengths were calculated from the coil current. The frequency of the alternating field was 380-412 kHz.

Mechanical Testing and Healing:

The flexural modulus was measured for 2×4×25 mm bars in an MTS 858 Minibionix II, using a 100N load cell. The geometry of the testing apparatus was consistent with standard ASTM o 790M. An actuator velocity of 10 mm/minute was used to insure brittle fracture of the material. Samples were cast in molds formed from crosslinked PDMS (Sylgard 184) coated with Rainex®, to further decrease adhesion of the polymer to the mold. All samples were initially cast in a laboratory oven. After fracture, the samples were returned to the mold and then revolved in the coil at field strength of 14.2 mT for 300 s. The samples were allowed to cool for 12-20 hours to permit full curing of the material before mechanical testing.

Example

The monomers used were a trisfuran (pentaerythritol propoxylate tris(3-(furfurylthiol)propionate, or PPTF), and a bismaleimide (1,1'-(methylenedi-4,1-phenylene)bismaleimide, DPBM), as illustrated in Scheme 2 (Diels-Alder reaction between furan and maleimide functionalities). At lower temperatures, equilibrium favors the forward reaction, resulting in bond formation and gelation. At elevated temperatures the retro-Diels-Alder reaction is favored, and the bond is reversibly broken.

Scheme 2

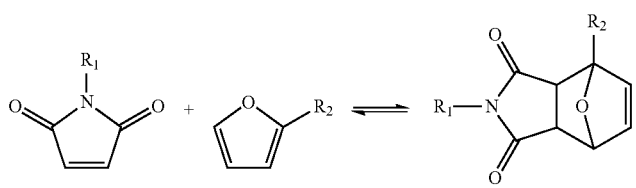

a)

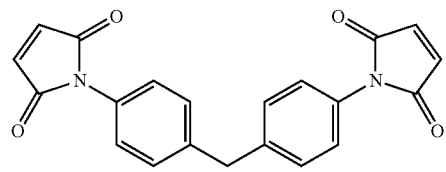

b)

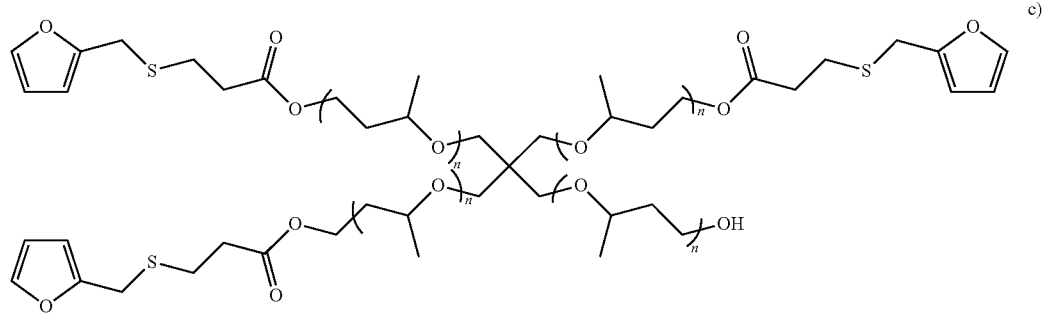

c)

n~1

This system had a gel-point temperature of 92° C. (Adzima et al., 2008), which is well below the Curie temperature of chromium oxide (113° C.). The alternating magnetic field precludes the use of a thermocouple for bulk materials temperature measurement, and consequently, an infrared pyrometer was used to measure the composite surface temperature. FIG. 1 illustrates the steady-state temperature reached by a polymer composite as a function of the magnetic field strength for several compositions of chromium (IV) oxide. For a given particle concentration, each data set may be divided into three regions: a low steady-state temperature region that is below a critical magnetic field strength; a high steady-state temperature region that is above a critical magnetic field strength; and a transition between these behaviors that displays history path dependence or hysteresis.

Below a critical magnetic field strength (left of the grey box in FIG. 1), both the hysteresis heating and resistive heating of the coil produced a slight temperature rise. Despite internal water cooling, the coil temperature increased linearly with power owing to AC resistive heating. As a consequence, the thermal gradient at the sample boundary decreased, causing a small rise in the bulk temperature, observed in samples with no particles. Above a critical magnetic field strength (right of the grey box in FIG. 1), the steady-state temperature became nearly independent of the applied field, with a slight temperature rise, associated with coil resistive heating. Further investigation revealed that the steady-state temperature in this region has a weak dependence on the particle concentration. A 0.1% wt. loading resulted in a maximum steady state temperature of ~120° C., while a 10.0% wt. loading resulted in a maximum steady state temperature of 146° C., which approached the temperature observed in the bulk material, 149° C. Interestingly, all of these temperatures were above the Curie temperature of chromium oxide, suggesting either the presence of impurities in the particles, such as chromium III oxide, or viability of another heating mechanism, such as by induction via particle agglomerates. Between the lower and upper critical field strength (within the grey box in FIG. 1) there was a large path dependent shift between low and high steady state temperature regimes, respectively. For example, increasing the field strength of the 1.0% wt. sample from 9.6 to 11.1 mT, resulted in a temperature rise of 29.6 to 43.5° C. However, decreasing the field strength from 11.5 to 11.1 mT resulted in a steady-state temperature decrease of from 126 to 119° C., rather than the expected 43.5° C. This path dependence demonstrated the non-linear temperature effect of heat generation in chromium (IV) oxide coupled with the heat transport in the surrounding medium.

For comparison, FIG. 1B illustrated the heating behavior of $\gamma$-$Fe_2O_3$ in the polymer for two compositions: 1.0% wt. (●) and 0.12% wt. (■). The Neel temperature (analogous to the Curie temperature, except that it occurs in antiferromagnetic materials) of $\gamma$-$Fe_2O_3$ is 690° C., compared to 113° C. for $CrO_2$, and the resulting steady state temperatures reached by the composite were considerably greater for significant concentrations of susceptor particles.

Figure 2:
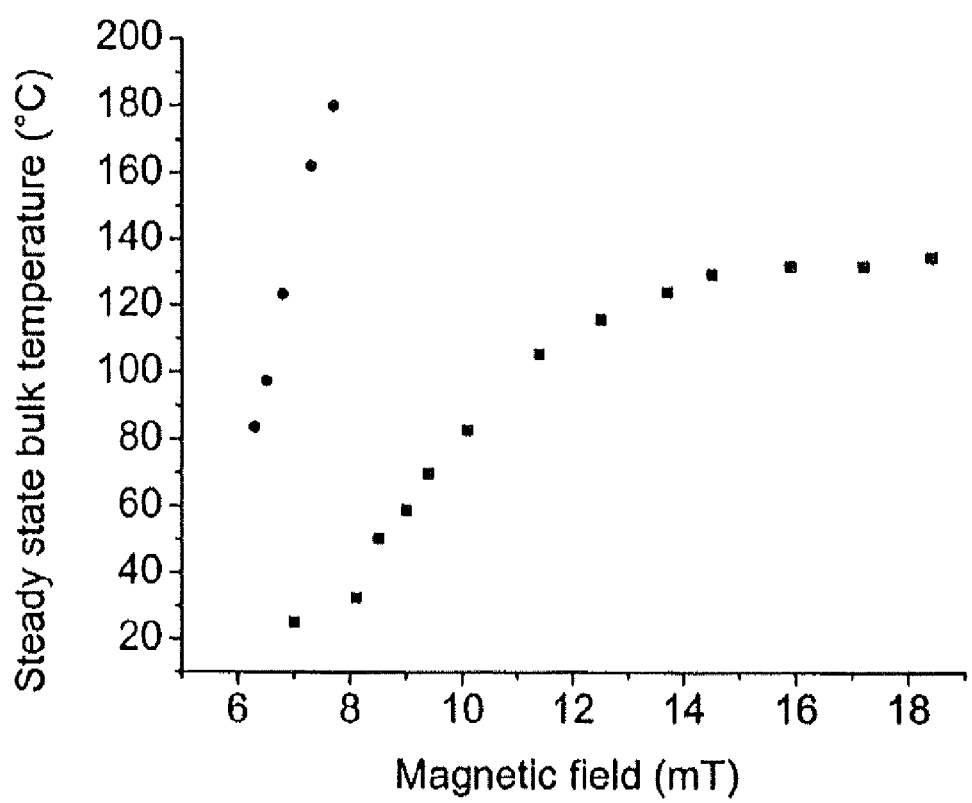
FIG. 2 is a graph illustrating the temperature versus magnetic field strength for two different concentrations of $\gamma\text{-Fe}_2\text{O}_3$ particles (1.0% wt. (●) and 0.12% wt. (■)) in a thermoreversible polymer composition.

When heated to 110° C. the material showed liquid-like behavior with a viscosity twice that of glycerol (~3 Pa·s). Accordingly, upon activation in a radio frequency field at a suitable strength, the material with 1.0% wt. $CrO_2$ readily flowed and rapidly wetted a Teflon mold, as illustrated in FIG. 2. This process could be repeated, wherein the material was repeatedly cycled between gel and sol states, allowing the material to be reshaped multiple times. Numerous cycles could be achieved because the rate of irreversible side reactions was minimal at the temperatures reached by the hysteresis heating mechanism.

Figure 3:
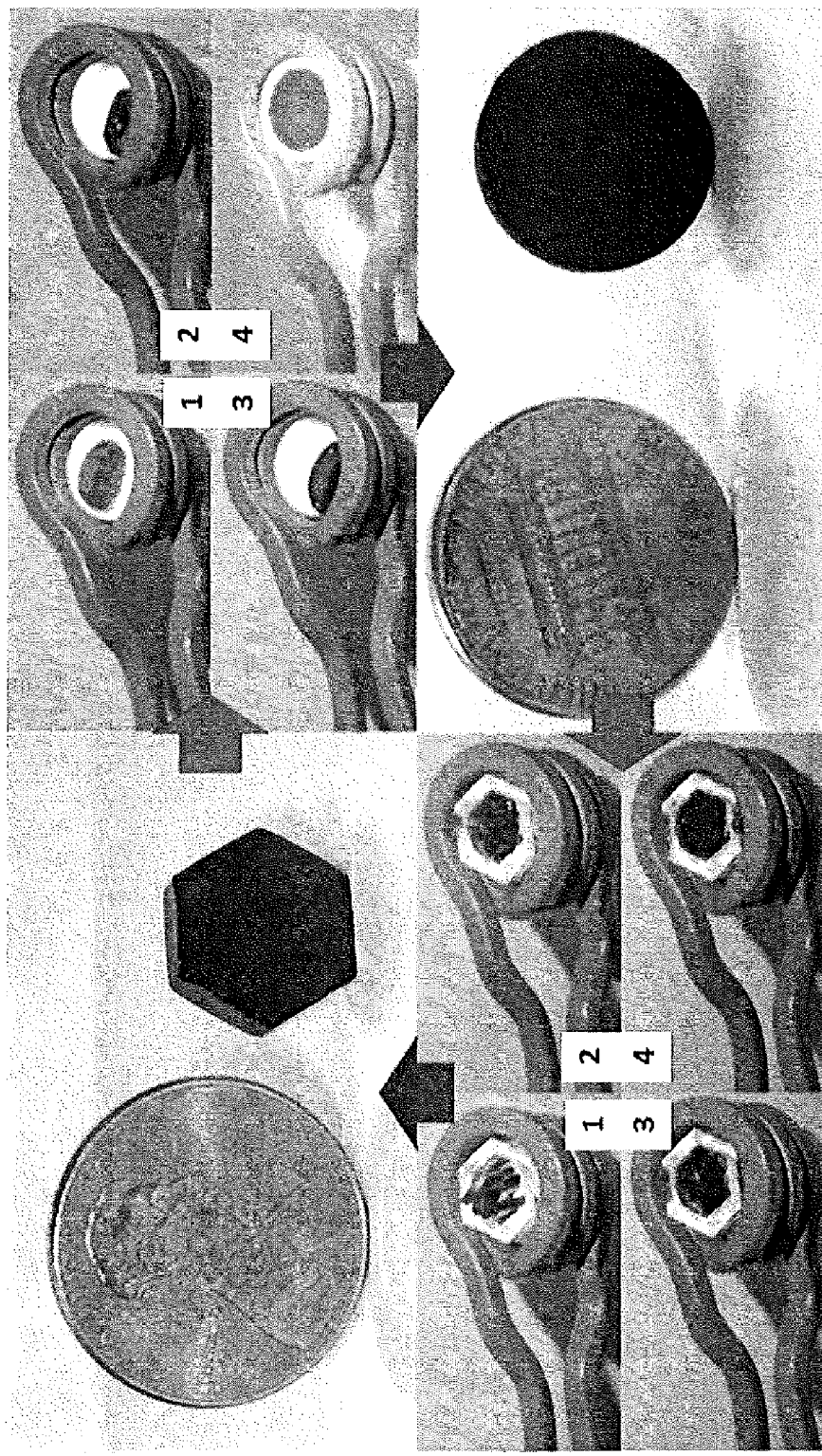
FIG. 3 is a set of photos illustrating a thermoreversible covalent adaptable composition being cycled between gel and liquid states so that it can be reshaped. Upper left: Sample of PPTF/DPBM with 1.0% wt $CrO_2$ cast as a hexagonal flat. Upper right: The hexagonal sample was placed in a mold and heated by a ~15 mT field at 390 Hz for ~150 s. Pictures were numbered sequentially as the sample depolymerized and flowed to fill the differently shaped mold. Lower right: After shutting off the field and allowing the sample to cool, the round flat shown could be removed from the mold. Lower left: The round flat was then fractured and placed in the hexagonal mold and heated using the same magnetic field. After cooling the hexagonal flat was recovered.
Figure 4:
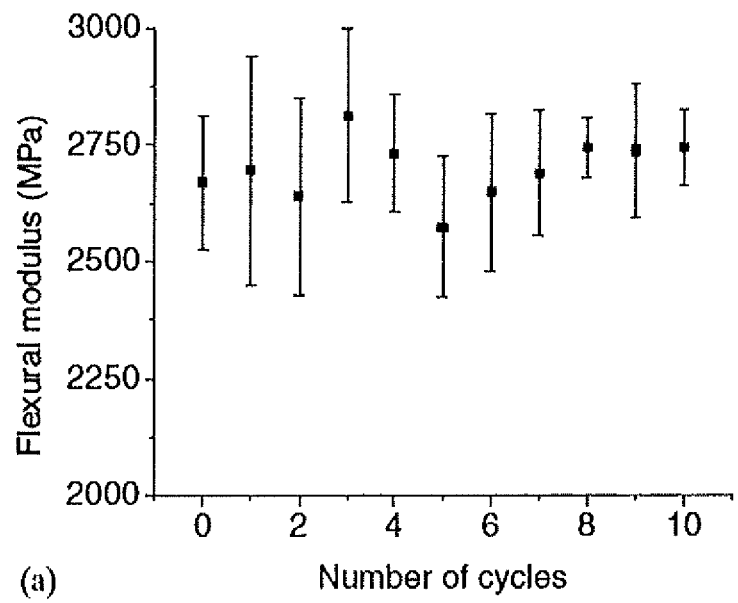
FIG. 4, comprising
Figure 4:
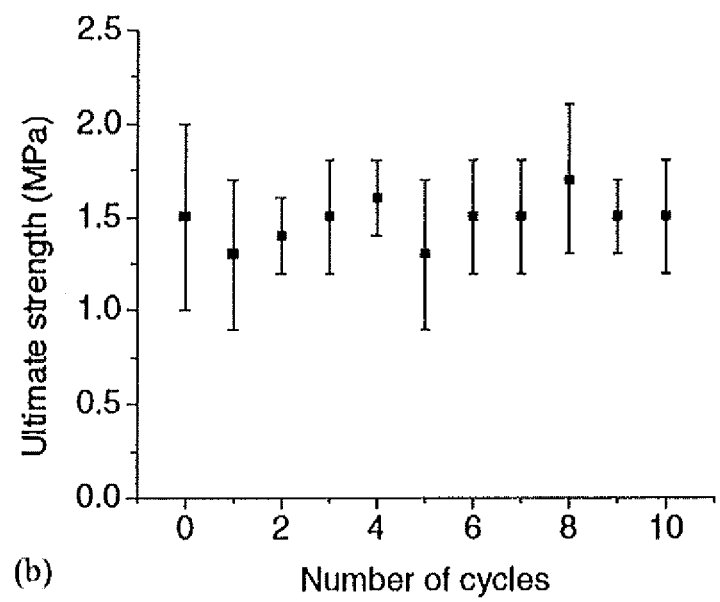

To demonstrate the reversibility of this system and its inherent ability to heal damage, the flexural modulus of the material was measured in ten heating and fracturing cycles. In these experiments complete recovery of the flexural modulus and ultimate strength was demonstrated (FIG. 3). This result compared favorably with remendable polymers that heal only through bond rearrangement and that only demonstrate 80% recovery of fracture toughness though two cycles (Chen et al., 2002; Chen et al., 2003). Furthermore, healing via the gel-to-sol transition was advantageous as it negates the problem of perfectly aligning the fractured surfaces, and does not require the samples to be forced back together. The thermoreversible chemical bond approach also showed advantages over the reptation based healing in thermoplastics. Poly(methyl methacrylate) composites employing ferrimagnetic $\gamma$-$Fe_2O_3$ particles as a magnetic susceptor showed complete recovery of the Young's modulus and reduced elastic modulus over six cycles; however, this material required 24 times the amount of heating time to heal (Cathrin & Marek, 2009). The very nature of autonomic self-healing materials, that is healing without intervention, is a significant advantage as these systems show 75% of mechanical properties (White et al., 2001), however, without employing complicated lithographic processes to create reservoirs of healing compounds within the composite, such materials are limited to a single healing event (Toohey et al., 2007; Christopher et al., 2009).

The incorporation of magnetically susceptible particles in a thermoreversible chemical gel resulted in a material that undergoes a reversible gel-to-sol transition when placed in an alternating magnetic field. The gel-to-sol transition allowed the material to flow, and upon cooling macroscopic fractures were healed. Unlike some other self-healing materials, this approach was both repeatable and rapid, without requiring reactants to be dispersed in the material or a detailed mechanical microstructure. The self-limiting nature of the heating mechanism further protected the system from irreversible degradation during multiple healing cycles. While reversible chemical gels had inherent limitations, such as thermal stability, in appropriate applications they provide a successful route towards creating materials and devices that can be readily repaired instead of being discarded upon crack formation or material failure. The ability of electromagnetic fields to penetrate optically thick composite materials combined with the ability of such materials to be repeatedly healed could prove particularly useful in applications where large polymer composites, such as wind turbines and helicopter rotors, are subjected to repeated stresses, and the fatigue induced cracks must be healed to prevent catastrophic failure.

REFERENCES

Adzima, B. J., Aguirre, H. A., Kloxin, C. J., Scott, T. F., & Bowman, C. N., 2008, "Rheological and Chemical Analysis of Reverse Gelation in a Covalently Cross-Linked Diels-Alder Polymer Network"; Macromolecules 41(23): 9112-9117.

Ahmed, T. J., Stavrov, D., Bersee, H. E. N., & Beukers, A., 2006, "Induction welding of thermoplastic composites—An overview"; Composites Part A—Applied Science and Manufacturing 37(10):1638-1651.

Boul, P. J., Reutenauer, P., & Lehn, J. M., 2005, "Reversible Diels-Alder reactions for the generation of dynamic combinatorial libraries"; Organic Letters 7(1):15-18.

Bozorth, R. M., 1978, Ferromagnetism: Piscataway, N.J., IEEE Press.

Cathrin, C. C., & Marek, W. U., 2009, "Repairing Polymers Using Oscillating Magnetic Field", Advanced Materials 21:1-5.

Chen, X. N., & Ruckenstein, E., 1999, "Thermally reversible linking of halide-containing polymers by potassium dicyclopentadienedlcarboxylate", Journal of Polymer Science Part A—Polymer Chemistry 37(23):4390-4401.

Chen, X., Dam, M. A., Ono, K., Mal, A., Shen, H. B., Nutt, S. R., Sheran, K., & Wudl, F., 2002, "A thermally re-mendable cross-linked polymeric material", Science 295(5560): 1698-1702.

Chen, X., Wudl, F., Mal, A. K., Shen, H. B., & Nutt, S. R., 2003, "New thermally remendable highly cross-linked polymeric materials", Macromolecules 36(6):1802-1807.

Christopher, J. H., Willie, W., Kathleen, S. T., Nancy, R. S., Scott, R. W., & Jennifer, A. L., 2009, "Self-Healing Materials with Interpenetrating Microvascular Networks", Advanced Materials 21(41):4143.

Chung et al., 2004, Chem. Mater. 16:3982.

Cordier, P., Tournilhac, F., Soulie-Ziakovic, C., & Leibler, L., 2008, "Self-healing and thermoreversible rubber from supramolecular assembly", Nature 451(7181):977-980.

Deng et al., 2010, Macromolecules 43:1191.

Endo, T., Suzuki, T., Salida, F., & Takata, T., 1996a, "A novel approach for the chemical recycling of polymeric materials: The network polymer reversible arrow bifunctional monomer reversible system", Macromolecules 29(9): 3315-3316.

Endo, T., Suzuki, T., Sanda, F., & Takata, T., 1996b, "A novel network polymer linear polymer reversible arrow linear polymer reversible system. A new cross-linking system consisting of a reversible cross-linking-depolymerization of a polymer having a spiro orthoester moiety in the side chain", Macromolecules 29(13)-4819.

Engle, L. P., & Wagener, K. B., 1993, "A review of thermally controlled covalent bond formation in polymer chemistry", Journal of Macromolecular Science-Reviews in Macromolecular Chemistry and Physics C33(3):239-257.

Grigoras, M., Sava, M., Colotin, G., & Simlonescu, C. I., 2008, "Synthesis and thermal behavior of some anthracene-based copolymers obtained by Diels-Alder cycloaddition reactions", Journal of Applied Polymer Science 107(2):846-853.

Heath, W. H., Palmieri, F., Adams, J. R., Long, B. K., Chute, J., Holcombe, T. W., Zieren, S., Truitt, M. J., White, J. L., & Willson, C. G., 2008, "Degradable cross-linkers and strippable imaging materials for step-and-flash imprint lithography", Macromolecules 41(3):719-726.

Higakl, Y., Otsuka, H., & Takahara, A., 2006, "A thermodynamic polymer crosslinking system based on radically exchangeable covalent bonds", Macromolecules 39(6): 2121-2125.

Israelachvili, J., 2002, Intermolecular and Surface Forces: London, Academic Press.

Jones, J. R., Liotta, C. L., Collard, D. M., & Schiraldi, D. A., 1999, "Cross-linking and modification of poly(ethylene terephthalate-co-2,6-anthracenedicarboxy by Diels-Alder reactions with maleimides", Macromolecules 32(18): 5786-5792.

Kennedy, J. P., & Castner, K. F., 1979, "Thermally reversible polymer systems by cyclopentadienylation. 2. Synthesis of cyclopentadiene-containing polymers", Journal of Polymer Science Part A—Polymer Chemistry 17(7):2055-2070.

Kittel, C., 1996, Introduction to Solid State Physics: New York, John Wiley & Sons, Inc.

Kloxin et al., 2010, Macromol. 43 (6):2643-2653.

Kronmuller & Fahnle, "Micromagnetism and the Microstructure of Ferromagnetic Solids", Cambridge Univ. Press, 2003, pp. 106

Miyagawa, T., Shimizu, M., Sanda, F., & Endo, T., 2005, "Six-membered cyclic carbonate having styrene moiety as a chemically recyclable monomer. Construction of novel cross-linking-de-cross-linking system of network polymers", Macromolecules 38(19):7944-7949.

Murkami, "The Characteristics of Ferrite Cores with Low Curie Temperature and Their Application" IEEE Transactions on Magnetics, June 1965, page 96.

Murphy, E. B., Bolanos, E., Schaffner-Hamann, C., Wudl, F., Nutt, S. R., & Auad, M. L., 2008, "Synthesis and Characterization of a Single-Component Thermally Remendable Polymer Network: Staudinger and Stille Revisited", Macromolecules 41(14):5203-5209.

Nijenhuis, K. T., 1997, "Thermoreversible networks—Viscoelastic properties and structure of gels"—Introduction, Thermoreversible Networks, p. 1-12.

Odian, G., Principles of Polymerization, 3rd ed.; John Wiley & Sons, Inc.: New York, 1991.

Ono et al., 2007, Chem. Commun, 46.

Park, J. S., Takahashi, K., Guo, Z. H., Wang, Y., Bolanos, E., Hamann-Schaffner, C., Murphy, E., Wudl, F., & Hahn, H. T., 2008, "Towards Development of a Self-Healing Composite using a Mendable Polymer and Resistive Heating", Journal of Composite Materials 42(26):2869-2881.

Reutenauer, P., Boul, P. J., & Lehn, J. M., 2009, "Dynamic Diels-Alder Reactions of 9,10-Dimethylanthracene: Reversible Adduct Formation, Dynamic Exchange Processes and Thermal Fluorescence Modulation: European Journal of Organic Chemistry 11:1691-1697.

Salamone, J. C., Chung, Y., Clough, S. B., & Watterson, A. C., 1988, "Thermally reversible covalently crosslinked polyphosphazenes", Journal of Polymer Science Part A—Polymer Chemistry 26(11)2923-2939.

Sershen, S. R., Mensing, G. A., Ng, M., Halas, N. J., Beebe, D. J., & West, J. L., 2005, "Independent optical control of microfluidic valves formed from optomechanically responsive nanocomposite hydrogels", Advanced Materials 17(11):1366.

Sivakumar et al., 2008, J. Electrochem. Soc., 155 (8), P83-P88

Smit & Wijn, "Ferrites", John Wiley & Son, 1959, page 156.

Stevens, M. P., & Jenkins, A. D., 1979, "Crosslinking of polystyrene via pendant maleimide groups", Journal of Polymer Science Part A Polymer Chemistry 17(11)3675-3685.

Suwanwatana, W., Yarlagadda, S., & Gillespie, J. W., 2006, "Influence of particle size on hysteresis heating behavior of nickel particulate polymer films: Composites Science and Technology", 66(15):2825-2836.

Takeshita, Y., Uri, M., Hirai, Y., & Uchiyama, M., 1971, "Thermoplastic Plastic Composition", U.S. Pat. No. 3,826,760.

Toomey, K. S., Sotto, N. R., Lewis, J. A, Moore, J. S., & White, S. R., 2007, "Self-healing materials with micro vascular networks", Nature Materials 6(8):581-585.

White, S. R., Sotto, N. R., Gable, P. H., Moore, J. S., Kessler, M. R., Siam, S. R., Brown, E. N., & Viswanathan, S., 2001, "Autonomic healing of polymer composites", Nature 409 (6822):794-797.

Zhang, X. K., Li, Y. F., Xiao J. Q., & Wetzel, E. D., 2003, "Theoretical and experimental analysis of magnetic inductive heating in ferrite materials," J. Appl. Phys. 93:7124-7126

What is claimed is:

1. A composite comprising a reversibly crosslinked thermoset polymer,
wherein magnetic field responsive particles are dispersed within the composite, wherein the Curie or Neel temperature of the particles is lower than 150° C.,
wherein the reversibly crosslinked thermoset polymer is generated by forming covalent bonds among a plurality of monomers,
wherein each covalent bonds formed by polymerization of the plurality of monomers is a thermally reversible covalent bond,
wherein applying an electromagnetic field of given strength alternating at a first frequency to the composite heats the composite to a first temperature at which a portion of the thermally reversible covalent bonds is broken, and
wherein the first temperature is lower than the temperature at which the polymer undergoes irreversible decomposition.

2. The composite of claim 1, wherein the magnetic field responsive particles comprise a particle selected from the group consisting of a ferrimagnetic particle, ferromagnetic particle, antiferromagnetic particle, and a combination thereof.

3. The composite of claim 2, wherein the magnetic field responsive particles comprise a particle selected from the group consisting of chromium (IV) oxide, ferrite, cobalt, nickel, and a combination thereof, wherein the ferrite is compounded with at least one element selected from the group consisting of zinc, manganese cobalt, nickel, lithium, iron, copper, and a combination thereof.

4. The composite of claim 1, wherein the thermoreversible covalent bonds are formed via a reaction selected from the group consisting of Diels-Alder reaction, nitroso dimerization, azlactone-phenol adduct formation, alkoxyamine formation, cyclic carbonate formation, combination thereof.

5. The composite of claim 1, wherein the average size of the magnetic field responsive particles is less than or equal to about 100 microns.

6. A method of repairing at least one crack or fracture in a polymer-containing composite, the method comprising the steps of:
providing a polymer-containing composite comprising at least one crack or fracture,
wherein the inner surfaces of the at least one crack or fracture comprise a reversibly crosslinked thermoset polymer,
wherein the reversibly crosslinked polymer is generated by forming covalent bonds among a plurality of monomers,
wherein each covalent bond formed by polymerization of the plurality of monomers is thermally reversible covalent bond,
wherein magnetic field responsive particles are dispersed within the crosslinked composite, wherein the Curie or Neel temperature of the particles is lower than 150° C.,
applying an electromagnetic field of given strength alternating at a given frequency to the polymer-containing composite,
wherein the applying heats the polymer-containing composite to a first temperature at which a portion of reversible bonds is broken,
wherein the first temperature is lower than the temperature at which the polymer undergoes irreversible decomposition;
providing contact among the inner surfaces of the at least one crack or fracture; and,
cooling the polymer-containing composite to a second temperature lower than the first temperature;
thereby repairing the at least one crack or fracture in the polymer-containing composite.

7. The method of claim 6, wherein the second temperature is equal to or lower than the gel-point temperature of the polymer-containing composite.

8. The method of claim 6, wherein the first temperature is equal to or higher than the gel-point temperature of the polymer-containing composite.

9. The method of claim 6, wherein the magnetic field responsive particles comprise a particle selected from the group consisting of a ferrimagnetic particle, ferromagnetic particle, antiferromagnetic particle, and a combination thereof.

10. The method of claim 9, wherein the magnetic field responsive particles comprise a particle selected from the group consisting of chromium (IV) oxide, ferrite, and a combination thereof, wherein the ferrite is compounded with at least one element selected from the group consisting of zinc, manganese, cobalt, nickel, lithium, iron, copper, and a combination thereof.

11. The method of claim 6, wherein the thermoreversible covalent bonds are formed via a reaction selected from the group consisting of Diels-Alder reaction, nitroso dimerization, azlactone-phenol adduct formation, alkoxyamine formation, cyclic carbonate formation, polyalkylhydrazone formation, [2+2] cycloaddition, and a combination thereof.

12. A method of bonding at least two polymer-containing composites, comprising the steps of:
  providing at least two polymer-containing composites,
    wherein the surfaces to be joined of the at least two polymer-containing composites comprise a reversibly crosslinked thermoset polymer,
    wherein the reversibly crosslinked polymer is generated by forming covalent bonds among a plurality of monomers,
    wherein each covalent bond formed by polymerization of the plurality of monomers is a thermally reversible covalent bond,
    wherein magnetic field responsive particles are dispersed within the crosslinked polymer, wherein the Curie or Neel temperature of the particles is lower than 150° C.;
  applying an electromagnetic field of given strength alternating at a given frequency to the at least two polymer-containing composites,
    wherein the applying heats the at least two polymer-containing composites to a first temperature at which a portion of the thermally reversible covalent bonds are broken,
    wherein the first temperature is lower than the temperature at which the polymer undergoes irreversible decomposition;
  contacting the surfaces to be joined of the at least two polymer-containing composites; and,
  cooling the surfaces to be joined of the at least two polymer-containing composites to a second temperature lower than the first temperature;
  thereby joining the at least two polymer-containing composites.

13. The method of claim 12, wherein the second temperature is lower than the gel-point temperature of the polymer-containing composite.

14. The method of claim 12, wherein the first temperature is equal to or higher than the gel-point temperature of the polymer-containing composite.

15. The method of claim 12, wherein the magnetic field responsive particles comprise a particle selected from the group consisting of a ferromagnetic particle, ferromagnetic particle, antiferromagnetic particle, and a combination thereof.

16. The method of claim 15, wherein the magnetic field responsive particles comprise a particle selected from the group consisting of chromium (IV) oxide, ferrite, and a combination thereof, wherein the ferrite is compounded with a metal selected from the group consisting of zinc, manganese, cobalt, nickel, lithium, iron, copper, and a combination thereof.

17. The method of claim 15, wherein the thermoreversible covalent bonds are formed via a reaction selected from the group consisting of Diels-Alder reaction, nitroso dimerization, azlactone-phenol adduct formation, alkoxyamine formation, cyclic carbonate formation, polyalkylhydrazone formation, [2+2] cycloaddition, and a combination thereof.

* * * * *